(12) United States Patent
Pugh et al.

(10) Patent No.: US 10,981,326 B1
(45) Date of Patent: Apr. 20, 2021

(54) THREE-DIMENSIONAL PRINTED OBJECTS WITH OPTIMIZED PARTICLES FOR SINTERING AND CONTROLLED POROSITY

(71) Applicant: Tethon Incorporated, Omaha, NE (US)

(72) Inventors: Gregory C. Pugh, Council Bluffs, IA (US); Karen A. Linder, Omaha, NE (US)

(73) Assignee: Tethon Incorporated, Omaha, NE (US)

( * ) Notice: Subject to any disclaimer, the term of this patent is extended or adjusted under 35 U.S.C. 154(b) by 265 days.

(21) Appl. No.: 15/960,269

(22) Filed: Apr. 23, 2018

Related U.S. Application Data

(60) Provisional application No. 62/489,046, filed on Apr. 24, 2017.

(51) Int. Cl.
| | |
|---|---|
| *B29C 64/165* | (2017.01) |
| *B29C 64/264* | (2017.01) |
| *B22F 3/105* | (2006.01) |
| *B22F 1/00* | (2006.01) |
| *B22F 3/11* | (2006.01) |
| *B28B 1/00* | (2006.01) |
| *B33Y 10/00* | (2015.01) |
| *B33Y 80/00* | (2015.01) |

(52) U.S. Cl.
CPC .......... *B29C 64/165* (2017.08); *B22F 1/0059* (2013.01); *B22F 3/1055* (2013.01); *B22F 3/11* (2013.01); *B28B 1/001* (2013.01); *B29C 64/264* (2017.08); *B33Y 10/00* (2014.12); *B33Y 80/00* (2014.12)

(58) Field of Classification Search
None
See application file for complete search history.

(56) References Cited

U.S. PATENT DOCUMENTS

| | | | | |
|---|---|---|---|---|
| 2009/0261287 A1* | 10/2009 | Withey | .................. | H01L 41/37 252/62.54 |
| 2018/0318922 A1* | 11/2018 | Valls Angles | ......... | C22C 1/0416 |

* cited by examiner

*Primary Examiner* — David Sample
*Assistant Examiner* — Elizabeth Collister
(74) *Attorney, Agent, or Firm* — Kevin E. West; Advent, LLP

(57) ABSTRACT

A three-dimensional printed structure can include a photo-curable resin, a sinterable material, and a plurality of elongated particles. The elongated particles are distributed within the printed structure. The elongated particles are shaped and distributed to promote porosity control (e.g., improved densification) within the structure.

16 Claims, 3 Drawing Sheets

THREE-DIMENSIONAL PRINTED OBJECTS WITH OPTIMIZED PARTICLES FOR SINTERING AND CONTROLLED POROSITY

RELATED APPLICATIONS

This application claims domestic priority to U.S. Provisional Application No. 62/489,046, filed Apr. 24, 2017, entitled "THREE-DIMENSIONAL PRINTED OBJECTS WITH OPTIMIZED PARTICLES FOR SINTERING AND CONTROLLED POROSITY," the contents of which are hereby incorporated by reference thereto. This application is further related to the following U.S. Non-Provisional Application, concurrently filed herewith: U.S. patent application Ser. No. 15/960,253, entitled "PHOTOPOLYMER DEVELOPMENT RESIN BASE FOR USE WITH THREE-DIMENSIONAL PRINTER," the contents of which are hereby incorporated by reference thereto.

BACKGROUND

Sintering is the process of compacting and forming a solid mass of material by heat and/or pressure without melting it to the point of liquification (e.g., purely solid state; or some liquid state being present among solid grains). A sintering process where no melting occurs is generally considered to be solid-state sintering, while a sintering process where some appreciable amount of liquid (e.g., a glass phase) is present during the densification and bonding process is typically considered to be a liquid-phase sintering process. Powder-based sintering methods generally begin with forming a green-state (e.g., initial, pre-firing, pre-sintering) bodies. The green-state bodies may be formed, for example, by such methods as die processing or hot and/or cold isostatic pressing. Such green-state bodies can include a sinterable powder (e.g., a ceramic, a metal, or a combination thereof) and a binder.

The binder can be used to hold the structure together until the powder particles can be heated and, in some instances, placed under enough pressure to begin bonding with one another (e.g., binder no longer needed to retain the body structure). Such binders may include one or more inorganic products, like clays, or organic products, like cellulose, resins, polyacrylates, or polyvinyl alcohol. Typically, a binder improves the mechanical strength of dry pieces, disperses readily when mixed with a powder to be sintered, does not readily stick to mold walls, leaves a minor amount of ash upon firing, and burns out and/or decomposes at a low temperature (e.g., at a temperature before extensive sintering occurs). The structure can then be further processed under some combination of time and high temperature and, potentially, pressure to achieve a suitably sintered body. Ceramic, metal, and/or composite parts, by way of example, have been successfully derived from such powder forming techniques.

DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Overview

Figure 1:
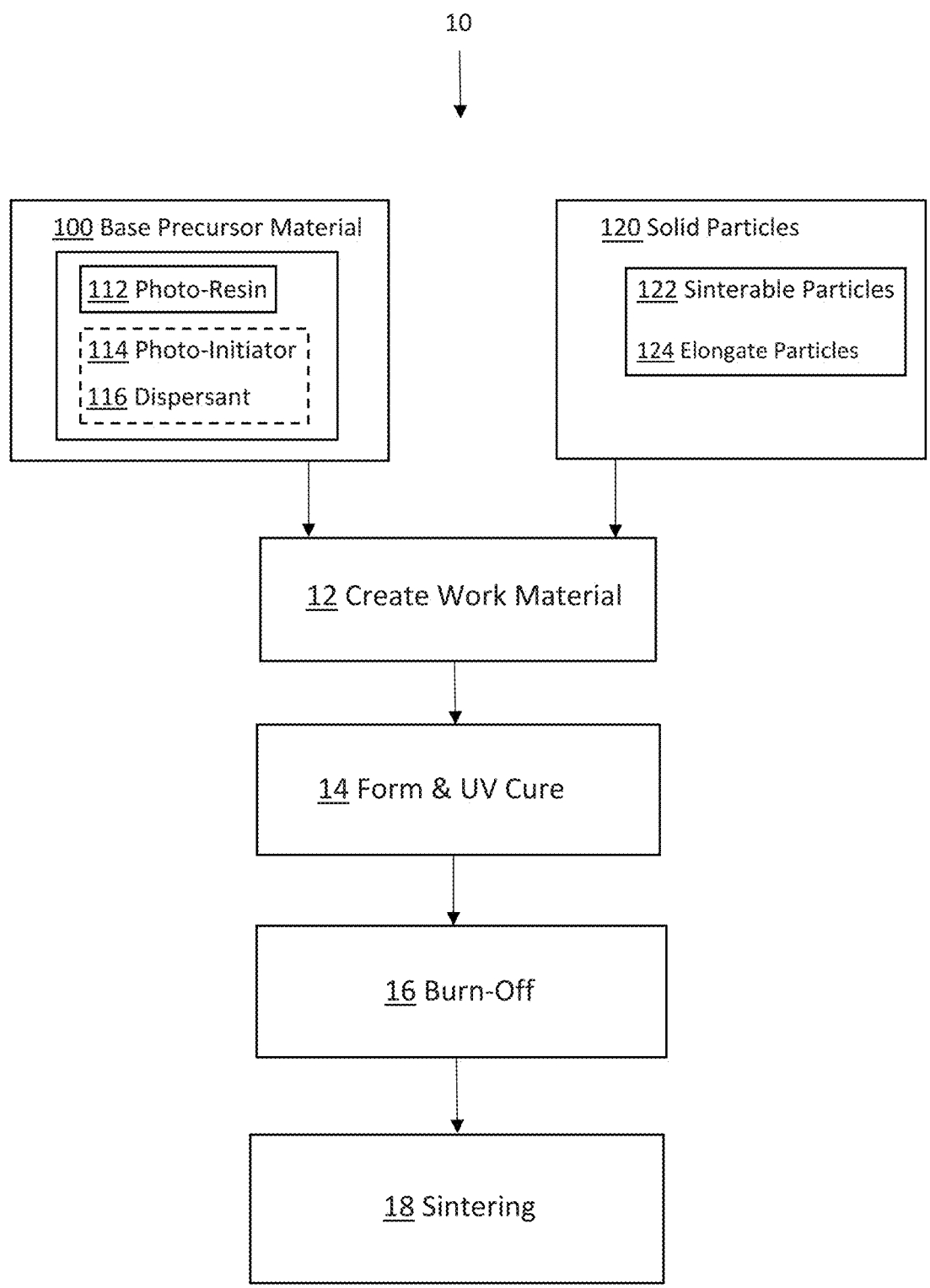
FIG. 1 is a flow chart of a powder processing technique for creating a sintered component derived from a green body formed using three-dimensional printing process, in accordance with an example implementation of the present disclosure.

The initial packing density of a green-state (i.e., pre-fired/pre-sintered) body to be sintered can be limited by the need to accommodate outgassing of the green-state body prior to sintering. As stated above, the green-state body can incorporate one or more binders that are expected to burn-off and/or decompose (350-1100° F.) prior to significant sintering occurring (generally beginning at temperatures of more than 1000° F., even for metals), generating one or more gaseous by-products (e.g., $CO_2$, $H_2O$). Such gaseous by-products can interfere with the densification process by promoting porosity within the structure (e.g., gas can become trapped in the structure as powder particles become bound to one another), and porous structures can be inclined to have less strength than a similarly composed component with a greater density (e.g., compared to theoretical density). The presence of porosity in ceramic structures generally can have a distinct negative effect on the strength and/or toughness of the resulting component. Accordingly, the general desire when sintering powders and, particularly, ceramic powders is to maximize the outgassing of a component prior to any significant sintering occurring.

The present process and the related green-state structure can improve the outgassing capability during the pre-sintering heating stage (e.g., during a burn-off phase). The primary ceramic and/or metal powders to be sintered may be, for example, plate-shaped and/or three-dimensional (e.g., regular and/or irregular). However, to improve the outgassing capability of the green-state (e.g., pre-fired) structure, the green-state structure can incorporate a secondary material in the form of elongated particles (i.e., particles that are significantly longer than they are wide and/or thick) that can remain substantially intact at least through the binder burn-off and/or decomposition stage. Such elongated particles can help with outgassing in at least a couple of manners, e.g., by creating linear pathways along which gases can be channeled; and/or by promoting a reduced maximum possible packing (relative to that possible using only primary particles). The improved outgassing effects may permit a density to be achieved that is within 99% or greater of the theoretical density for a given member. In some embodiments, adjusting the amount of elongated particles and/or other components may provide some control over the porosity, e.g., facilitating a lesser density (i.e., relative to theoretical), purposefully yielding a particular level of porosity.

The creation of linear pathways via the elongated particles can make it easier for gases to travel through the structure than by just following paths along particles and/or gaps between adjacent particles. For example, the linear pathways can be more direct, and the presence of the elongated particles throughout the structure can increase the opportunities and/or ease for gases to make it from an interior of a part to an exterior thereof. The elongated particles can be, by way of example, whiskers, acicular crystals, and/or tubular particles. If tubular particles, the particles can define an internal flow path for gasses, in addition to an external path along the length thereof. In some embodiments, the elongated particles may be wide and/or thick enough to make such particles sufficiently stiff to not collapse during forming of the green-state body and/or during initial stages of outgassing. In some embodiments, the elongated particles are not fibrous in nature, so as to provide a certain degree of stiffness, at least into an outgassing stage.

All these types of elongated particles offer exterior pathways (e.g., exterior surfaces) along which gases can travel, but the tubular particles each also provide an interior volume (e.g., tube interior) through which gases can flow relatively unimpeded within the structure. In some embodiments, the tubular particles can be made of one or more of a kaolin material or a feldspar material, for example, halloysite (an aluminosilicate clay mineral ($Al_2Si_2O_5(OH)_4$)). Specific examples of such tubular particles are Dragonite halloysite (a halloysite from the Dragon Mine in central Utah at a reported purity of 99% halloysite) and New Zealand Kaolin (NZK) (i.e., a kaolin (clay) from a deposit in New Zealand that can be concentrated up to 98% halloysite on a dry matter basis, upon processing). In some embodiments, elongate whisker particles may be used, which, for example, may be formed of wollastonite ($CaSiO_3$). Wollastonite offers low loss of ignition and can act as a flux. NZK carries a small amount of material that can generate gases in the burn-off phase and can offer increased slip properties (e.g., potentially more favorable effect on viscosity, possibly allowing more of it to be used, if desired). In some embodiments, metal tubes, metal needles, carbon nanotubes, and/or wollastonite (the latter due, in part, to its calcium content) may be amenable for use in metal or alloy structures to be sintered. Carbon nanotubes, for example, may be conducive for use with iron, iron alloys, or steel. The composition of the metal tubes or needles may be chosen based on their compatibility with the metal or alloy powder(s) to be sintered.

In some embodiments, the elongated particles make up 2-40% (by weight) of the solids (e.g., powder) portion (e.g., sinterable particles and elongated particles), and, in some embodiments, the elongated particles make up 5-30% of the solids portion. Such ranges may be affected by having enough of the elongated particles to aid in venting/outgassing and not so much thereof as to have an unacceptable negative effect, e.g., on the viscosity of the base material to be formed into the green-state body and/or on the green-state strength. That is, the shape/profile aspects of the elongated particles that allow them to interfere with the packing structure may also impede the flow (i.e., increase viscosity) of a base material incorporating those elongated particles and/or limit the green-state strength.

With respect to the maximum packing capability, the elongated particles can interfere with the overall packing scheme, thereby ensuring outgassing pathways. That is, the sinterable powders may have a same general shape (if not the same size), and that can lend the powders to an optimum packing structure. The optimum packing structure, while generally desirable for sintering later in processing, can provide more tortuous paths for outgassing and may even tend to trap any gases within that structure, particularly once any sintering begins. Thus, when sinterable powders are to be used, the choice often has previously been to use a lower percentage of powder within the base material to get less optimal packing and/or filling of the green-state structure, to provide better outgassing paths later in processing. In some embodiments, porosity of the printed object can be controlled by varying the quantity of elongate particles in the resin material.

Since the elongated particles do not fit in the packed structure in the same manner as the sinterable particles, the maximum theoretical packing is reduced by the presence of such elongated particles. While seemingly counterintuitive, that reduced maximum packing can permit a greater amount of the sinterable particles to be included in the base material used to form the green-state object or structure. That is, more sinterable particles can be used without running the risk of overly limiting the outgassing capabilities of the structure being formed. Additionally, the elongated particles may serve a reinforcing function, at least in the green state, similar to using whiskers and/or fibers in a composite structure. Because of the combined aspects of the linear flow pathways and reduced maximum packing associated with providing the elongated particles, in some embodiments, it is possible to load 50% (by weight) or more of the sinterable particles into the base material. In some embodiments, the loading may be 70% (by weight) or more.

In some embodiments, the present system and the green-state products associated with them can be formulated to minimize the presence of water within the body, whether incorporated into the particles being processed and/or the binders used or whether added as a process aid. In some embodiments, a non-aqueous or nearly non-aqueous (e.g., water being less than 10% by weight or less than 5% by weight) system is used. In some embodiments, more than 90% (by weight) of the powder portion of the green-state body is non-water soluble (e.g., 91% non-water soluble; and 9% wollastonite and/or New Zealand kaolin). Minimizing the water in the system can reduce the total amount of gases that may need to be outgassed later in processing.

In some embodiments, the green-state product is colloidal in nature, not relying on water soluble materials for initial processing (e.g., forming) thereof. In some embodiments, calcined materials and/or frits are used as the base materials for some or all of the primary particles, as such materials have had, e.g., any potential water and/or organics previously driven off (e.g., via dehydration and/or decomposition) therefrom (i.e., calcined materials and/or frits generally have a reduced outgassing potential). Frit choice can be important. As the resin burns out, it can be desirable to start the melt and/or sinter process soon thereafter. In some embodiments, an amount of frit can be provided to help hold the clay together before the frits and silica start melting and/or sintering, reducing the risk that the object may start to crack and distort. Example frits that may be used are 3124 frit (a leadless high calcium alumina borosilicate frit) and/or 3249 frit (a leadless magnesia borosilicate frit). Frit 3124 is sodium-containing with a high amount of alumina to help stabilize while melting. The sodium-containing frit melts at a relatively low temperature of 1700° F. It, however, can become tacky before reaching that temperature. This tackiness can help keep a structure held together while approaching sintering. Frit 3249 melts closer to 1900° F. but has a low thermal expansion value, so it does not promote warping as it goes to a higher temperature (e.g., 2300° F.).

In some embodiments, the elongated particles are in the form of non-calcined tubular particles (e.g., may carry water and/or some organics). Such non-calcined tubular particles may collapse and/or shrink (e.g., shrinkage can start at 950° F. for tubular kaolin and/or halloysiste materials) at temperatures associated with or approaching the sintering stage. That is, the non-calcined tubular materials generally remain intact at outgassing temperatures (350-650° F.), where their tubular shape can be of use (e.g., calcining these materials beforehand may reduce or eliminate their tubular aspect). In some embodiments, the tubular particles may become part of a liquid or glassy phase during the sintering step.

In some embodiments, the powders (e.g., primary and/or secondary) can be a range of sizes (e.g., to promote more efficient initial packing thereof), and in some embodiments, the powders can be size 300 mesh (i.e., able to pass through a screen with 300 openings per inch) or smaller, or, more particularly, in a range of 300-375 mesh. The use of smaller mesh particles can be beneficial because the driving force for densification is the change in free energy from the decrease in surface area and lowering of the surface free energy by the replacement of solid-vapor interfaces, and the change in energy is much higher when the radius of curvature is less than a few micrometers, which is one of the main reasons why much ceramic technology is based on the use of fine-particle materials. However, in some embodiments (e.g., where a three-dimensional (3D) printer is employed), the powder may be larger than 400 mesh in size (e.g., 300-375 mesh) to avoid forming a gel, which can otherwise make printing and/or other forming processes difficult.

Additive manufacturing (e.g., three-dimensional printing) techniques have been developed, which have the potential to greatly expand the potential shapes and/sizes of the green-state objects that can be formed and eventually sintered to create a final product. With respect to three-dimensional (3D) printing using the materials associated with the present system, the base material for printing may include a sinterable powder (e.g., ceramic, metal, plastic, composite), an amount of the elongated particles, and a binder (e.g., a photocurable resin, in the case of 3D printing). The base material for printing may further include a photo-initiator and a dispersant (i.e., an agent (e.g., a non-surface active polymer or a surface-active substance) added to a suspension to improve the separation of particles and to retard settling or clumping). In some embodiments, the base material includes a binder precursor fluid (e.g., all the base material ingredients except for the sinterable powder and the elongated particles). The binder precursor fluid, in one embodiment, includes 3-5% (by weight) photo-initiator, 0.25-2% (by weight) or 0.9-1% (by weight) dispersant, and resin as the remainder. The photo-initiator can aid in promoting the curing of the resin upon exposure to ultraviolet (UV) light (e.g., 10 to 405 nanometer (nm) wavelength), and the dispersant can help the mixture to sufficiently gel and keep the solid materials suspended in the base material until printed or otherwise formed. The binder precursor fluid may need the solids (e.g., the sinterable powder and/or the elongated particles) to be added to it, as the solids can act as a photo-blocker (e.g., in terms of interfering with light transmission) for the 3D-printed structure to be formed. In some embodiments, an additional amount (e.g., 0.01%-0.1% (by weight)) of a photo-blocker may be used (e.g., to improve crispness of details in a cured, printed object), but that amount may be less (e.g., by a factor of four or more) than that typically used with UV resins, given that the added solids can serve as photo-blockers or photo-interference agents (e.g., physically interfering with light via, for example, opacity, reflectivity, and/or translucence), as well. The resin may be a photo-curable resin and, in some embodiments, can be an ultraviolet (UV) curable resin. The binder precursor fluid may further include a diluent (i.e., a diluting agent), as well.

In some embodiments, the binder fluid (e.g., mainly resin) makes up 15-55% (by weight) of the material, with the remainder being solids (e.g., sinterable powder and/or elongated particles). In some other embodiments, the material contains up to 90% (by weight) photopolymer resin. The quantity and formulation of the polymer resin to be used can be chosen based on one or more factors. Examples of such factors are the desired level of fluid flow during printing (e.g., motivation to increase its amount); the amount to be burned off later (e.g., motivation to minimize the fluid amount); the ratio of solids to the binder precursor fluid needed to achieve an appropriate level of photo-blocking (e.g., motivation to decrease the fluid amount); and/or the amount needed to get the desired level of green-state bonding (e.g., motivation to increase the fluid amount).

A 3D printing (e.g., additive manufacturing) step can be used to form the green-state structure in the present system. In some embodiments, the printed green-state structure may be formed using a photo-curing-based (e.g., ultraviolet-based (UV) or daylight) printing method. For example, the photo-curing-based printing method can be one of stereolithography (SLA) printing, lithography-based ceramic manufacturing (LCM), digital light synthesis, daylight polymer printing, Continuous Liquid Interface Production (CLIP; originally Continuous Liquid Interphase Printing), or digital light projection (DLP) printing. Any such printing method relies on photocuring (i.e., photoinduced hardening of a monomeric, oligomeric, or polymeric substrate, normally using ultraviolet (UV) light) of a photo-curable resin and may incorporate one or more photo-initiators and/or one or more photo-blockers (e.g., chemical photo-blockers and/or photo-interference materials) to promote that photocuring process. The printed structure can be in its final shape upon curing of the photocurable resin. It is to be understood that the utility of employing elongate particles in a structure subject to resin or binder burn-off is not necessarily limited to additive manufacturing processes but may extend to other green-state forming processes (e.g., slip-casting; investment casting; pressing; etc.). Such uses of elongate particles (e.g., in green-state formations intended for burn-out and sintering) are considered to be within the scope of the present disclosure.

The cure time and/or the cure depth can be highly dependent on the base materials being used (e.g., the precursor/resin and the solids). In some embodiments, silica ($SiO_2$) and/or alumina ($Al_2O_3$) can be used as part of the sinterable powder to enhance the cure depth and/or to reduce the cure time needed, as UV light can penetrate such materials rather well. In fact, silica promotes a greater cure depth than does alumina because UV light can penetrate it so well. When using silica and/or alumina, it is to be understood that a higher sintering temperature may be necessary, unless fluxes (i.e., materials that can lower the firing temperature) are incorporated as part of the sinterable powder. In some embodiments, clays can be used (alone or in combination with silica and/or alumina) to promote UV penetration into a given printed structure. It is to be understood that an increased amount of photo-initiator and/or thinner print layers can be used as well (alone or in combination with high UV-transmission materials) to help get a sufficient cure. No matter the combination of materials, cure times, and/or individual print layer thicknesses employed, it can be important to have the resin fully set to improve firing outcomes, as under-curing can lead to less than optimal sintering results. Further, it is to be understood that the shape, the size, and/or the depth of the part can also affect the curing parameters and thus need to be accounted for when determining an appropriate curing process for a given part.

Example Implementations

FIG. 1 provides a flow chart of the present method 10 for forming a sintered structure, in accordance with an embodiment of the present disclosure. The present method 10 generally includes a first step 12 of creating a work material (e.g., printable or otherwise formable); a second step 14 of creating (e.g., via 3D printing, casting, depositing, or other forming procedure) and UV curing a formed (e.g., printed or otherwise generated) structure; a third step 16 of performing a burn-off (e.g., burning-off any organics; driving off any water, including water bound to any component materials); and a fourth step 18 of sintering the materials remaining after burn-off. In some embodiments, the second step 14 may include printing and curing, layer-by-layer; printing an object and post-curing; or forming by a non-printing method and curing. These general steps and the materials to be employed therein have been discussed in detail previously in the "Overview" section, so just the details needed to establish the method are discussed in detail with respect to FIG. 1.

The first step 12 of creating the work material can involve mixing of a base precursor material 100 and a plurality of solid particles 120. The base precursor material 100 can include a photo-resin 112 (e.g., a UV-curable resin) and may further include a photo-initiator 114 and/or a dispersant 116. Meanwhile, the solid particles 120 can include sinterable particles 122 (e.g., ceramic powders, metallic powders, or combinations thereof) and elongate particles 124 (e.g., acicular crystals, whiskers, needles, and/or tubular particles). While FIG. 1 shows the components of the base precursor material 100 and the solid particles 120 being distinctly added to form the work material per first step 12, it is to be understood that such components may be admixed in a single step to arrive at the final work material and still be within the scope of the present method. That said, there can be an advantage of separately forming the base precursor material 110, in that it allows for that portion to be shipped to any of a range of customers, permitting the customer to choose the solid particle composition to be added. Essentially, the base precursor material 110, without the solids portion yet added, can be generic to any of a range of products to be derived from the process. Also, the relative volume and/or the weight of the material to be shipped can be reduced, when the solid particles/powders 120 are to be added on-site.

Figure 2:
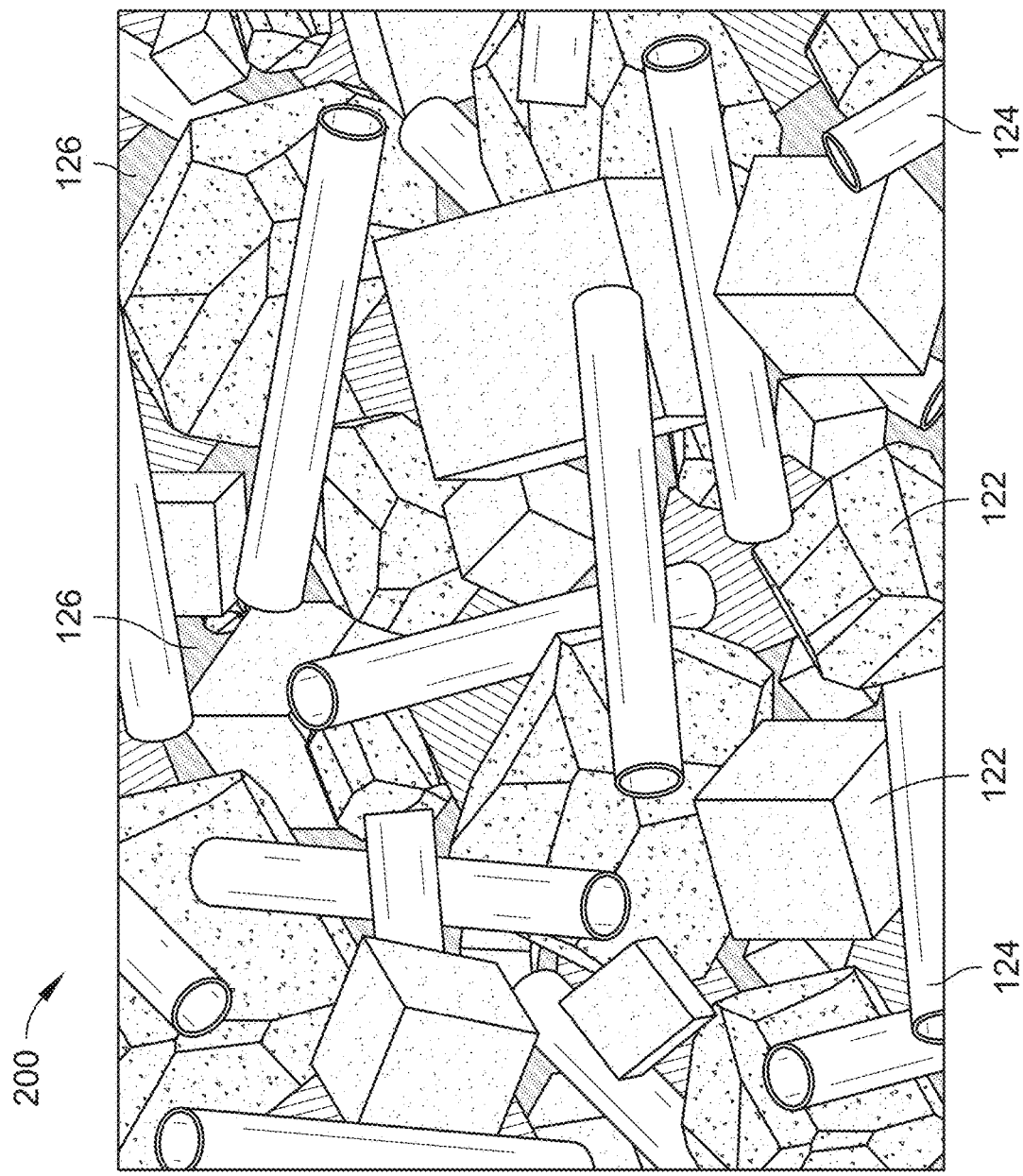
FIG. 2 is a diagrammatic, side, microstructure-level view illustrating an embodiment of a three-dimensional green-state object incorporating elongated particles, post binder burn-off and prior to sintering, in accordance with an example implementation of the present disclosure.

FIG. 2 diagrammatically illustrates an example, cross-sectional microstructure of a formed (e.g., printed) structure 200 after resin burn-off and prior to sintering. The microstructure of the formed structure 200 includes sinterable particles 122 and elongated particles 124. As the microstructure, in the illustrated embodiment, has not underwent full sintering and does not yet approach its theoretical density, porosity 126 (e.g., openings in the microstructure) may be present. As discussed previously, the distribution of the elongated particles 124 throughout the microstructure of the formed structure 200 can aid in venting/outgassing of the structure 200 by helping to channel gases away from the interior and toward the exterior of the structure. As seen from FIG. 2, there is a more direct flow path associated with any given elongated particle 124 than that which is generally available in the remainder of the structure 200. In some embodiments, such as that illustrated, by having a random or nearly random distribution of the elongated particles 124 within the structure 200, gases can be channeled toward any free surface and not just one or two selected surfaces, which may prove useful, for example, when the shape of the structure 200 is rather complex. In some embodiments (not shown), the elongated particles 124 may be preferentially oriented (e.g., generally co-directed or nearly so) within the structure 200 to concentrate outgassing toward one or two free surfaces, potentially increasing the outgassing efficiency (e.g., via more direct pathways). It is to be understood that a pre-sintered structure formed by a process other than 3D printing may have a similar microstructure as to that shown in the structure 200 and may similarly benefit from the presence of the elongated particles 124 (e.g., promotion of venting/outgassing), per the present disclosure.

Figure 3:
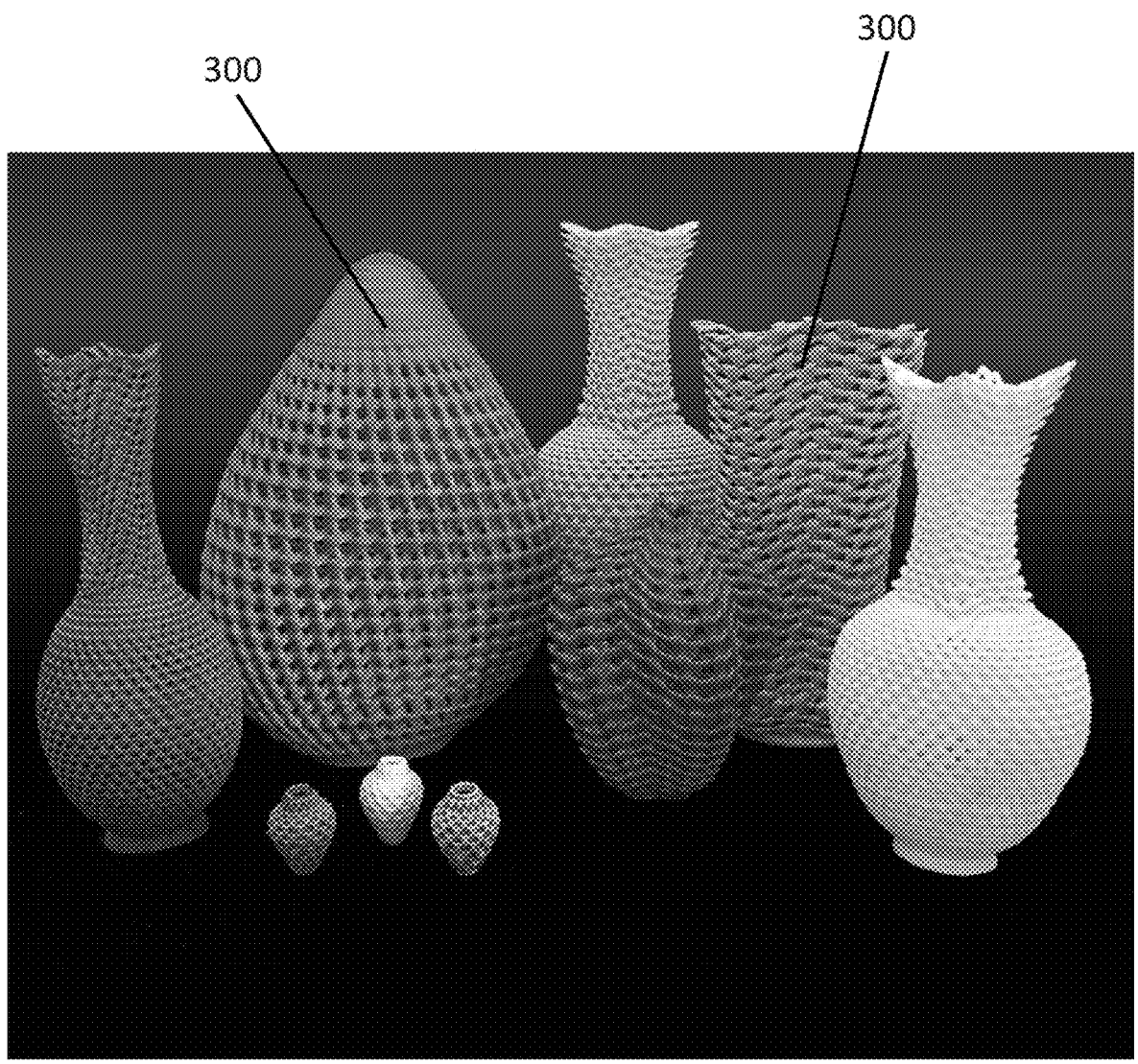
FIG. 3 is an isometric photograph of a series of sample parts that can be sintered from a three-dimensional green-state object incorporating elongated particles, in accordance with an example implementation of the present disclosure.

FIG. 3 is a picture of a plurality of example parts 300 made using the present process. As can be seen, it is possible to produce relatively complex parts using the present system and materials.

One example material that can be formed by the present process is a porcelain material. This porcelain material can use Frits (e.g., 1-60% by weight), calcined alumina (10-80%) and silica (e.g., 10-50%) for the sinterable powder/particles 122 and wollastanite (1-30%) for the elongated particles 124. By adding silica as a main filler instead of a grog and/or a fired porcelain like molochite (a highly-calcined alumina silicate), light can pass through the matrix, which can facilitate the 3D printing and UV curing step 14. Pure alumina bodies may have difficulty passing light through the matrix and can decrease the curing depth of the resin. Silica, though, because of its positive effect on curing depths, can facilitate the use of thicker print layers. The silica also can melt and/or sinter with the frits, helping to decrease porosity (e.g., any glassy phase can tend to flow into and fill spaces around any unmelted solid particles) and increase strength. Bodies made of a porcelain material can employ liquid-phase sintering, with some portion of the solids melting to form a glassy phase during firing. It is noted that curing times can matter greatly for this porcelain material. The presence of uncured resin or non-fully cured resin may cause the resin to bubble and/or boil when heated, making it desirable to vent the generated gases from the structure prior to any significant sintering occurring.

Another example material that can be formed by the present process is a glass-ceramic composite material. This composite material is much like the above porcelain material. However, it has silica as its primary solid ingredient (35-80% (by weight)) and main filler for the sinterable powder 122, with about 5-50% (by weight) alumina and 20-50% of various fluxes. Silica is more transparent than alumina. This composite-forming material can use halloysite (1%-30% of the solids) for the tubular, elongate particles 124 to allow for venting. This material may also employ one or more additional photo-blockers (beyond the powders since silica tends to allow more light to pass through), but the photo-blockers can be used in an amount lower than typically used with UV resins (e.g., because of the powders present). Use of fewer tubular particles 124 than in the above-example porcelain material becomes possible because silica's particles are more rounded and less plate-like than, for example, clay/kaolin and/or alumina materials. The rounded particles do not stack up like the plate-like particles and, accordingly, are not as prone to trapping gas. The tubular particles 124 also can help maintain suspension of the solid particles in the resin. The tubes and kaolin plates also can break up the matrix of the resin and powder to help float the silica within the green-state structure. The tubular, elongate particles 124 can float better in the resin mix 100/112, helping to hold up the round particles (e.g., the round particles thus may settle more slowly).

Another example material that can be formed by the present process is a metal composite material. This composite material is much like the previous described materials. However, it can utilize any of a number of metal powders (e.g. iron, platinum, stainless steel, silver, gold, titanium, and/or other metals or alloys) as its primary solid ingredient.

Low fire frits can be used to melt against the silica. The frits work with the silica filler to help at least a portion of it to melt, as Vitrolite (i.e., a structural glass) bodies can employ liquid-phase sintering, with some portion of the solids forming a glassy phase during firing (e.g., fired at a temperature of about 1900F-2150F). Firing can be performed at a temperature that promotes partial melting of the silica but leaving most of it intact, to retain the desired structural form. An amount of alumina may be employed to help maintain the structure of the silica and frits, as the alumina is less prone to melting, even in the presence of silica. Fumed silica can also be used as a suspension agent. With the fumed silica present in 0.4%-1.5% (by weight), the resin gels the solution up enough to suspend the particles. (The fumed silica may likewise be used, e.g., in the porcelain material, with similar effects.)

It is to be understood that aspects of the present process and system can be extended to forming of green-state bodies by processes other than 3D printing (e.g., slip casting, molding, press-forming), such as to take advantage of the use of photo-resins for the binder. When using resins as the binder, there can be a higher volume of gases released during burn-off because the amount of resin needed to initially bond the green-state structure together. Photo-resins may be chosen as the binder, for example, to eliminate a need for drying time (e.g., in relation to slip casting and/or investment casting), so their use outside of 3D printing or other additive manufacturing processes can have merit. If used with slip casting or investment casting, the related mold may be made of a clear material (e.g., a plastic), to facilitate exposure of the cast body to, e.g., UV light to promote curing of the resin binder. Thus, it can be advantageous to employ the features laid out above, e.g., regarding the use of elongate particles for outgassing and/or the provision of UV-transparent/translucent materials (e.g., silica) for improved curing, in situations where a photo-curable resin may be used as the binder for a green-body structure.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A printed structure, comprising:
    a three-dimensional printed structure comprising a photocurable resin, a sinterable material, and a plurality of elongated particles, the elongated particles being dispersed within the printed structure, the elongated particles being shaped and distributed to promote outgassing of the printed structure during a burn-off step for the photocurable resin, the elongated particles configured to at least one of collapse or enter a glassy phase at a temperature above the burn-off step.

2. The printed structure of claim 1, wherein the printed structure is in its final shape upon curing of the photocurable resin.

3. The printed structure of claim 1, wherein the elongated particles comprise at least one of whiskers, needles, acicular crystals, or tubular particles.

4. The printed structure of claim 3, wherein the elongated particles comprise tubular particles.

5. The printed structure of claim 4, wherein the tubular particles respectively provide an interior flow path for gases.

6. The printed structure of claim 1, wherein the elongated particles are comprised of at least one of a kaolin material, wollastonite, halloysite, or a feldspar material.

7. The printed structure of claim 1, wherein the sinterable material comprises at least one of a ceramic powder, a metal powder, or a plastic powder.

8. The printed structure of claim 7, wherein the sinterable material comprises a ceramic powder, the ceramic powder comprising at least one of a frit, alumina, or silica.

9. The printed structure of claim 1, wherein the printed structure is formed using an ultraviolet-based printing method.

10. The printed structure of claim 1, wherein the elongated particles initially comprise 2%-15% by weight of the printed structure.

11. The printed structure of claim 1, wherein the sinterable material initially comprises at least 30% by weight of the printed structure.

12. The printed structure of claim 1, wherein the sinterable material includes at least 10% by weight silica, the silica being present in a sufficient amount to promote penetration of ultraviolet light into the printed structure during a photocuring step.

13. The printed structure of claim 1, wherein the printed structure comprises a non-aqueous system.

14. A green-state structure, comprising:
    an object comprising a photocurable resin, a sinterable material, and a plurality of elongated particles, the elongated particles being dispersed within the object, the elongated particles being shaped and distributed to promote outgassing of the object during a burn-off step for the photocurable resin, the elongated particles configured to at least one of collapse, shrink, or enter a glassy phase at a temperature above the burn-off step.

15. The green-state structure of claim 14, wherein the elongated particles comprise tubular particles.

16. The green-state structure of claim 15, wherein the tubular particles are configured at least one of to collapse or to enter a glassy phase at a temperature above the burn-off step.

* * * * *